US012467510B2

(12) United States Patent
Lim

(10) Patent No.: US 12,467,510 B2
(45) Date of Patent: Nov. 11, 2025

(54) ELECTRONIC PARKING BRAKE

(71) Applicant: HL MANDO CORPORATION, Gyeonggi-do (KR)

(72) Inventor: Woochul Lim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 426 days.

(21) Appl. No.: 17/602,710

(22) PCT Filed: Apr. 8, 2020

(86) PCT No.: PCT/KR2020/004770
§ 371 (c)(1),
(2) Date: Oct. 8, 2021

(87) PCT Pub. No.: WO2020/209608
PCT Pub. Date: Oct. 15, 2020

(65) Prior Publication Data
US 2022/0163075 A1 May 26, 2022

(30) Foreign Application Priority Data
Apr. 12, 2019 (KR) .................. 10-2019-0042909

(51) Int. Cl.
F16D 51/12 (2006.01)
F16D 121/24 (2012.01)
F16D 125/42 (2012.01)

(52) U.S. Cl.
CPC .......... F16D 51/12 (2013.01); F16D 2121/24 (2013.01); F16D 2125/42 (2013.01)

(58) Field of Classification Search
CPC .. F16D 2121/24; F16D 65/22; F16D 2125/52; F16D 2127/06; F16D 2125/50;
(Continued)

(56) References Cited

U.S. PATENT DOCUMENTS 5,310,026 A * 5/1994 Shaw ...................... F16D 51/48
188/158
8,011,482 B2 * 9/2011 Boyle ................... B60T 13/746
188/156
(Continued)

FOREIGN PATENT DOCUMENTS

CN 107253474 10/2017
DE 10 2006 008 609 12/2006
(Continued)

OTHER PUBLICATIONS

WO 2016031898 A1 (Year: 2016).*
(Continued)

Primary Examiner — Robert A. Siconolfi
Assistant Examiner — Mahbubur Rashid
(74) Attorney, Agent, or Firm — WOMBLE BOND DICKINSON (US) LLP

(57) ABSTRACT

The present invention relates to an electronic parking brake and, more specifically, to an electronic parking brake in which an electronic actuator is applied to a drum brake, wherein noise can be reduced when transmitting the driving power of a driving motor, and a rotary shaft of the driving motor and a rotary shaft of a wheel cylinder can be arranged so as to be inclined relative to each other.

8 Claims, 5 Drawing Sheets

(58) Field of Classification Search
CPC .... F16D 49/00; F16D 65/561; F16D 2125/22; F16D 51/12; F16D 2125/42

See application file for complete search history.

(56) References Cited

U.S. PATENT DOCUMENTS

| | | | |
|---|---|---|---|
| 8,720,653 B2* | 5/2014 | Han | B60T 13/741 |
| | | | 188/156 |
| 9,440,626 B2* | 9/2016 | Akada | F16D 51/48 |
| 9,453,544 B2* | 9/2016 | Jung | B60T 11/046 |
| 9,555,779 B2* | 1/2017 | Oshio | F16D 51/20 |
| 9,976,614 B2* | 5/2018 | Gerber | F16D 51/20 |
| 10,274,033 B2* | 4/2019 | Song | F16D 55/226 |
| 10,654,460 B2* | 5/2020 | Winkler | B60T 13/741 |
| 2006/0278477 A1* | 12/2006 | Balz | F16D 51/48 |
| | | | 188/156 |
| 2014/0345989 A1* | 11/2014 | Oshio | B60T 13/741 |
| | | | 188/162 |
| 2015/0152928 A1 | 6/2015 | Yoon | |
| 2015/0345580 A1* | 12/2015 | Jung | B60T 13/02 |
| | | | 188/162 |
| 2016/0025171 A1 | 1/2016 | Choi | |
| 2017/0219036 A1* | 8/2017 | Song | F16D 65/0075 |

FOREIGN PATENT DOCUMENTS

| | | |
|---|---|---|
| DE | 10 2007 035 541 | 2/2008 |
| EP | 3 089 897 B1 | 2/2018 |
| JP | 2016-50630 | 4/2016 |
| JP | 2017-502231 | 1/2017 |
| JP | 2017-110775 | 6/2017 |
| KR | 10-1588351 | 1/2016 |
| WO | 2018/148245 | 8/2018 |

OTHER PUBLICATIONS

CN 106460978 B (Year: 2019).*
WO 2018148245 A1 (Year: 2018).*
KR 20120058733 A (Year: 2012).*
DE 102006009089 A1 (Year: 2007).*
DE 102014112307 B3 (Year: 2016).*
WO 2020245543 A1 (Year: 2020).*
International Search Report for PCT/KR2020/004770 mailed on Jul. 14, 2020 (now published as WO 2020/209608) with English translation provided by WIPO.
Written Opinion of the International Searching Authority for PCT/KR2020/004277 mailed on Jul. 14, 2020 (now published as WO 2020/209608) with English translation provided by Google Translate.
Office Action dated May 10, 2023 for German Application No. 10 2020 001 882.2 and its English translation by Google Translate.
Zahnrad, Wikipedia: "Cogwheel", Version from Apr. 8, 2019, pp. 1-15.
International Preliminary Report on Patentability (Chapter I) for PCT/KR2020/004277 issued on Sep. 28, 2021 and its English translation from WIPO (now published as WO 2020/209608).
Office Action dated Oct. 12, 2023 for Chinese Patent Application No. 202080028150.7 and its English translation from Global Dossier.
Office Action dated Nov. 13, 2023 for German Patent Application No. 11 2020 001 882.2 and its English machine translation by Google Translate.

* cited by examiner

ELECTRONIC PARKING BRAKE

CROSS-REFERENCE TO RELATED APPLICATIONS

This application is the national stage of International Application No. PCT/KR2020/004770, filed on Apr. 8, 2020, which claims priority, under 35 U.S.C. 119(a), to Korean Patent Application No. 10-2019-0042909 filed in Korea on Apr. 12, 2019, the disclosures of which are incorporated by reference herein in their entireties.

TECHNICAL FIELD

The present invention relates to an electronic parking brake and, more specifically, to an electronic parking brake in which an electronic actuator is applied to a drum brake to reduce noise when driving power of a driving motor is transmitted, and a rotary shaft of the driving motor and a rotary shaft of a wheel cylinder are disposed to be inclined mutually.

BACKGROUND ART

Generally, a parking brake is an apparatus for stopping a vehicle so that the vehicle does not move when the vehicle is parked and serves to hold a wheel of the vehicle so that the wheel does not rotate. As the parking brake, a drum brake type apparatus may be used, and generally, a braking force is generated by pulling a parking cable when a hand brake or foot brake is operated.

Although a study on an electronic parking brake, to which an actuator is applied, has been carried out for a drum brake type parking brake, since a plurality of planetary gears are used between a driving motor and an output shaft, there is a problem of loud noise.

In addition, since a driving shaft and the output shaft of the driving motor are disposed in parallel, there is a problem of lowering a degree of design freedom and installability.

Accordingly, there is a need for improvement in this area.

DISCLOSURE

Technical Problem

The present invention is directed to providing an electronic parking brake in which an electronic actuator is applied to a drum brake and which is capable of reducing noise when driving power of a driving motor is transmitted.

In addition, the present invention is directed to providing an electronic parking brake in which a rotary shaft of a driving motor and a rotary shaft of a wheel cylinder are disposed to be inclined mutually.

Technical Solution

One aspect of the present invention provides an electronic parking brake including a drum which rotates with a wheel of a vehicle, brake shoes installed at two sides in the drum to brake the drum, a wheel cylinder configured to push the brake shoes to bring the brake shoes into contact with an inner circumferential surface of the drum, and an actuator which generates driving power for driving of the wheel cylinder, wherein the actuator includes a driving motor which generates the driving power for braking of the drum and a transmission shaft which transmits the driving power of the driving motor to the wheel cylinder, and the electronic parking brake further includes a first helical gear part which transmits the driving power of the driving motor to the transmission shaft and a second helical gear part which transmits the driving power transmitted through the transmission shaft to the wheel cylinder.

The first helical gear part may include a driving gear provided on a driving shaft of the driving motor, and a first transmission gear provided one side of the transmission shaft and engaged with the driving gear.

A first angle may be formed between a rotary axis of the driving gear and a rotary axis of the first transmission gear.

The second helical gear part may include a second transmission gear provided at the other side of the transmission shaft, and a driven gear provided on the wheel cylinder and engaged with the second transmission gear.

A second angle may be formed between a rotary axis of the second transmission gear and a rotary axis of the driven gear.

Alternatively, the driven gear may be rotated by the driving power transmitted through the transmission shaft, and the brake shoes, which face each other, may be controlled to come into contact with the inner circumferential surface of the drum or to be separated from the inner circumferential surface of the drum according to a rotation direction of the driven gear.

A housing may be provided outside the actuator, and the housing may include a first housing surrounding the driving motor and one side of the transmission shaft and a second housing surrounding the wheel cylinder and the other side of the transmission shaft.

A through part installed to pass through a backing plate may be formed in the second housing.

A coupling part coupled to correspond to the through part may be formed in the first housing.

Advantageous Effects

In an electronic parking brake of the present invention having a structure described above, since a helical gear is used when driving power of a driving motor is transmitted to a wheel cylinder, noise can be reduced, and thus a user's product satisfaction can be improved.

In addition, inclination between the driving motor, a transmission shaft, and the wheel cylinder can be variously changed using first and second helical gear parts to correspond to a design specification, and thus a degree of design freedom and installability can be improved.

DESCRIPTION OF DRAWINGS

FIGS. 1 and 2 are perspective views illustrating an electronic parking brake according to the present invention, wherein FIG. 1 is the view illustrating the electronic parking brake when viewed from one side of a backing plate, and FIG. 2 is the view illustrating the electronic parking brake when viewed from the other side of the backing plate.

MODES OF THE INVENTION

Figure 1:
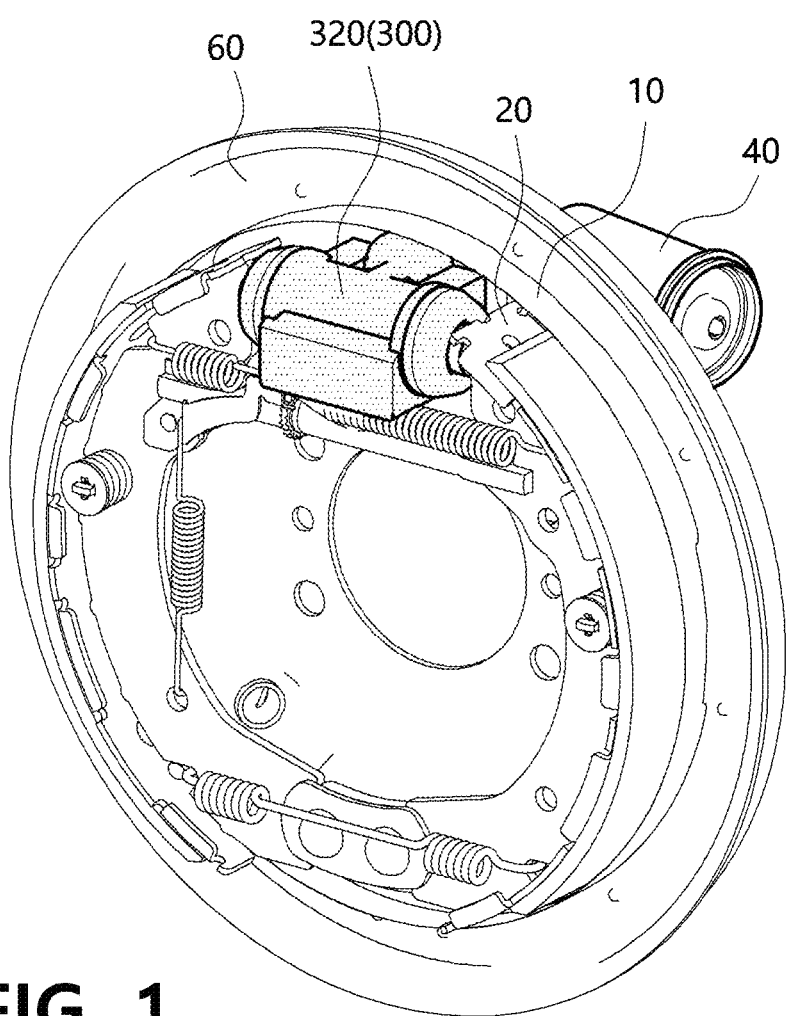

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to descriptions are omitted in the drawings in order to clearly explain the present invention, and the same or similar parts are denoted by the same reference numerals throughout this specification.

It should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof. In addition, when an element such as a layer, film, region, plate, or the like is referred to as being disposed "on" another portion, it includes not only the element being directly disposed on another element but also another element being disposed therebetween. Conversely, when an element such as a layer, film, region, plate, or the like is referred to as being "under" another portion, it includes not only the element being directly under another element but also another element being disposed therebetween.

Figure 2:
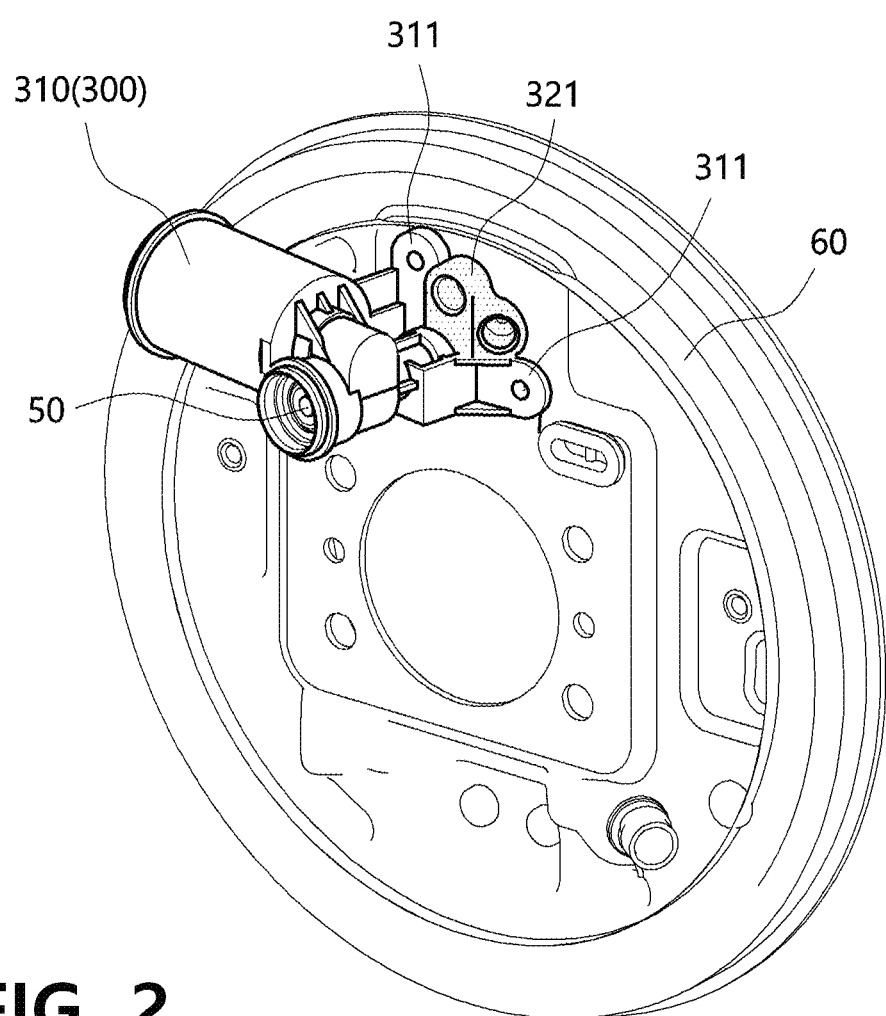
Figure 3:
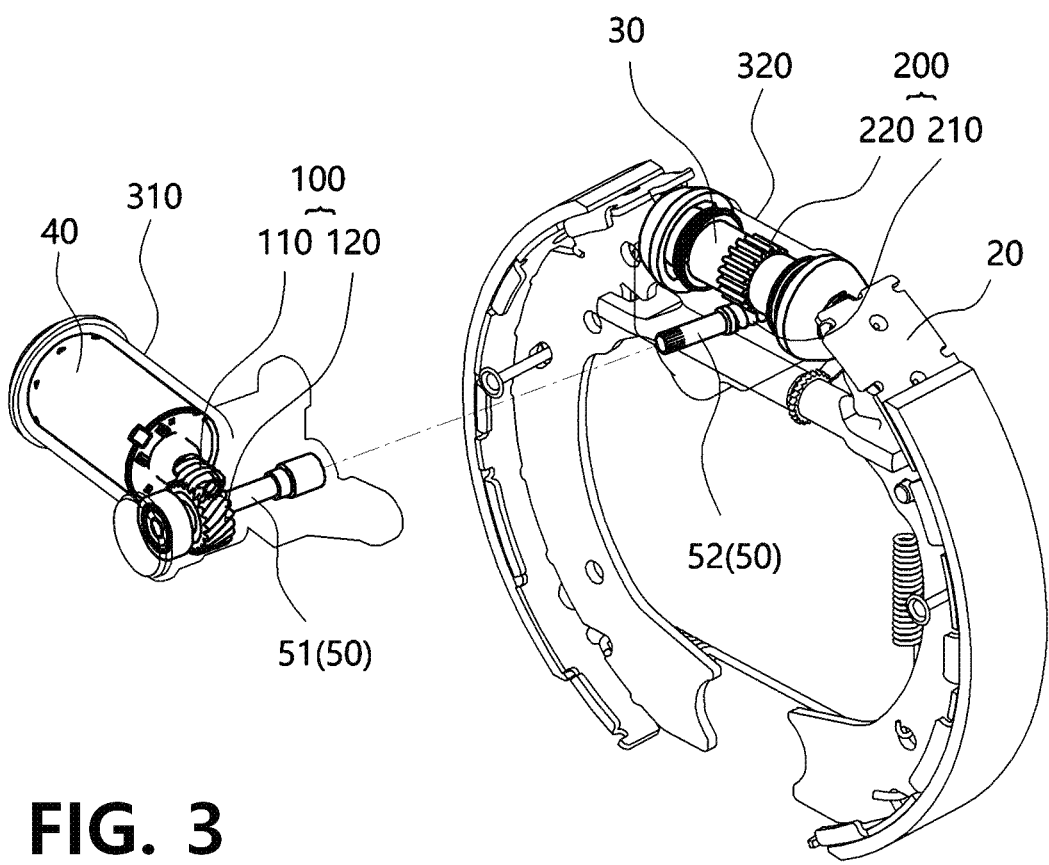
FIG. 3 is an exploded perspective view illustrating an actuator included in the electronic parking brake according to the present invention.
Figure 4:
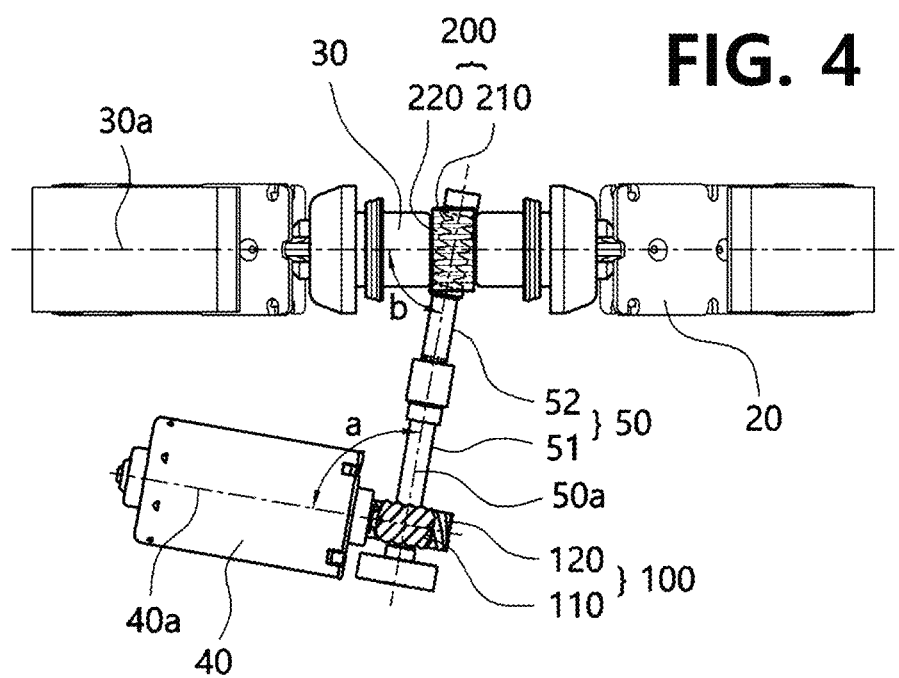
FIG. 4 is a plan view illustrating the actuator included in the electronic parking brake according to the present invention.
Figure 5:
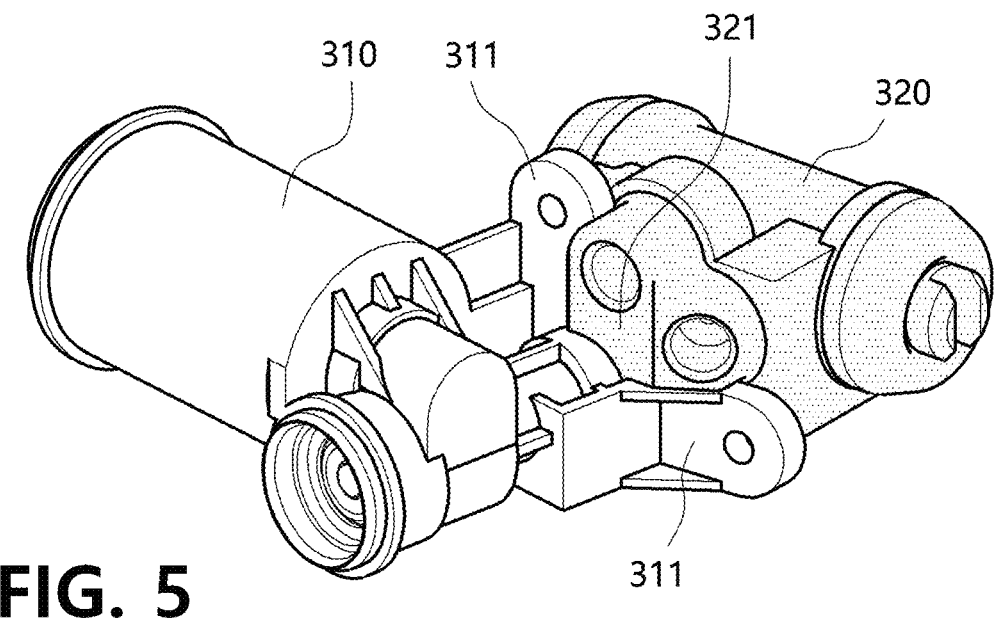
FIG. 5 is a perspective view illustrating the actuator of the electronic parking brake according to the present invention, that is, a view illustrating the actuator in a state in which the backing plate is removed.

FIGS. 1 and 2 are perspective views illustrating an electronic parking brake according to the present invention, wherein FIG. 1 is the view illustrating the electronic parking brake when viewed from one side of a backing plate, FIG. 2 is the view illustrating the electronic parking brake when viewed from the other side of the backing plate, FIG. 3 is an exploded perspective view illustrating an actuator included in the electronic parking brake according to the present invention, FIG. 4 is a plan view illustrating the actuator included in the electronic parking brake according to the present invention, and FIG. 5 is a perspective view illustrating the actuator of the electronic parking brake according to the present invention, that is, a view illustrating the actuator in a state in which the backing plate is removed.

As illustrated in FIGS. 1 to 3, the electronic parking brake includes a drum 10 which rotates with a wheel of a vehicle, brake shoes 20 disposed at two sides in the drum 10 to brake the drum 10, a wheel cylinder 30 which pushes the brake shoes 20 facing each other to bring the brake shoes 20 into contact with an inner circumferential surface of the drum 10, and an actuator which generates driving power for driving of the wheel cylinder 30.

The actuator includes a driving motor 40 which is electronically operated and generates driving power for braking the drum 10 and a transmission shaft 50 through which the driving power of the driving motor 40 is transmitted to the wheel cylinder 30.

The driving motor 40 generates a rotational force in a forward or reverse direction to generate the driving power for driving the wheel cylinder 30. The driving motor 40 is connected to a control unit (not shown) which controls the driving motor 40 so that an operation of the driving motor 40 is controlled. For example, the control unit controls the driving motor 40 to perform various operations, such as driving, stopping, forward rotation, and reverse rotation, through input signals transmitted according to operation commands of an operation switch manipulated by a driver. When a brake operation command or brake release command is input by the driver, the control unit rotates the driving motor 40 in a forward or reverse direction. In addition, the control unit may be connected to a load sensor (not shown) for detecting a magnitude of the driving power transmitted to the wheel cylinder 30 and may receive a signal output from the load sensor to stop the driving motor 40 when the driving power transmitted to the wheel cylinder 30 is greater than or equal to a predetermined magnitude.

The transmission shaft 50 transmits the driving power of the driving motor 40, and the transmission shaft 50 may include a first shaft 51 connected to the driving motor 40 and a second shaft 52 connected to the wheel cylinder 30. When the transmission shaft 50 is formed as described, and when the driving motor 40 and the wheel cylinder 30 are installed on a backing plate 60, since the first shaft 51 and the second shaft 52 are coupled to each other to constitute the transmission shaft 50, the transmission shaft 50 does not need to be installed additionally, and thus an actuator installation process may be simplified. The first shaft 51 and the second shaft 52 may be coupled in a manner in which any one shaft thereof is inserted into the other shaft. As an example, as illustrated in FIG. 3, a cover into which one end of the second shaft 52 is inserted and which surrounds the one end is formed on the first shaft 51, teeth protruding radially inward are formed on an inner circumferential surface of the cover, and tooth grooves into which the teeth are inserted are formed in the second shaft 52. Alternatively, teeth protruding radially outward may also be formed on the second shaft 52, and tooth grooves into which the teeth are inserted may also be formed in the first shaft 51.

The electronic parking brake may further include a first helical gear part 100 which transmits the driving power of the driving motor 40 to the transmission shaft 50 and a second helical gear part 200 which transmits the driving power transmitted through the transmission shaft 50 to the wheel cylinder 30. Since the first helical gear part 100 is provided to the driving motor 40, of which a rotation speed is high, to transmit the driving power to the transmission shaft 50, noise can be reduced, and since the second helical gear part 200 is provided to transmit the driving power transmitted to the wheel cylinder 30 through the transmission shaft 50, noise can be further reduced.

As illustrated in FIGS. 3 and 4, the first helical gear part 100 may include a driving gear 110 provided on a driving shaft 41 of the driving motor 40 and a first transmission gear 120 provided at one side of the transmission shaft 50 and engaged with the driving gear 110.

In this case, the driving gear 110 may be integrally formed with the driving shaft 41 of the driving motor 40. That is, a driving gear integrated type driving motor may be employed. As the driving shaft 41 of the driving motor 40 rotates, the first transmission gear 120 engaged with the driving gear 110 formed on the driving shaft 41 is rotated with the transmission shaft 50. In this case, the transmission shaft 50 is rotatably supported in a housing 300 which will be described below.

Particularly, a first angle a may be formed between a rotary axis 40a of the driving gear 110 and a rotary axis 50a of the first transmission gear 120. That is, the driving power provided through the driving gear 110 is changed by the first angle a and transmitted through the transmission shaft 50. In addition, when the first angle a is adjusted to meet a design specification, installability of the driving motor 40 can be improved.

The first transmission gear 120 may be formed through enveloping machining. Here, the enveloping machining is performed in a manner in which, when a tooth shape of one gear among two gears, which rotate according to a predetermined rule, is determined, a tooth shape of the other gear, which is rotated according to the one gear, is machined. That is, when a tooth shape of the driving gear 110 provided on the driving shaft 41 is determined, a tooth shape of the first transmission gear 120 may be machined through the enveloping machining, and in this case, the tooth shape of the first transmission gear 120 may be machined by considering both a vehicle design specification and installability.

In this case, teeth of a circumferential contact surface of the first transmission gear 120 may be formed to be inclined with respect to a gear axis at predetermined intervals so that the first transmission gear 120 is engaged with the driving gear 110.

In addition, a diameter of a pitch circle of the first transmission gear 120 may be formed to decrease in a direction from edges of both sides toward a center of a thickness so that the first transmission gear 120 tightly surrounds a part of a circumferential contact surface of the driving gear 110, and as a contact surface between the driving gear 110 and the first transmission gear 120 increases, a contact ratio increases.

The second helical gear part 200 may include a second transmission gear 210 provided at the other side of the transmission shaft 50 and a driven gear 220 provided on the wheel cylinder 30 and engaged with the second transmission gear 210.

As the transmission shaft 50 rotates, the driven gear 220 engaged with the second transmission gear 210 provided at the other side of the transmission shaft 50 is rotated together. The driven gear 220 may be integrally formed with the wheel cylinder 30.

That is, in a process in which the rotational driving power of the driving motor 40 is transmitted to the wheel cylinder 30 through the transmission shaft 50, since rotational movement is maintained without changing, transmission efficiency of the driving power can be improved, and noise can also be reduced.

In this case, since the second transmission gear 210 rotates with the first transmission gear 120 in a state in which the second transmission gear 210 is fixed to the transmission shaft 50, the first transmission gear 120 and the second transmission gear 210 share the rotary axis 50a.

A second angle b may be formed between the rotary axis 50a of the second transmission gear 210 and a rotary axis 30a of the wheel cylinder 30. That is, the driving power transmitted through the transmission shaft 50 is changed by the second angle b and transmitted to the wheel cylinder 30. In addition, when the second angle b is adjusted to meet a design specification, installability of the driving motor 40 and the wheel cylinder 30 may be improved.

As described above, the driven gear 220 may also be formed through enveloping machining. That is, when a tooth shape of the second transmission gear 210 provided on the transmission shaft 50 is determined, a tooth shape of the driven gear 220 may be machined through the enveloping machining, and in this case, the tooth shape of the driven gear 220 may be machined by considering both a vehicle design specification and installability.

In addition, as described above, teeth of a circumferential contact surface of the driven gear 220 may also be formed to be inclined with respect to a gear shaft at predetermined intervals so that the driven gear 220 is engaged with the second transmission gear 210, and in addition, a diameter of a pitch circle of the driven gear 220 is also be formed to decrease in a direction from edges of both sides toward a center of a thickness so that the second transmission gear 210 tightly surrounds a part of the circumferential contact surface of the driven gear 220, a contact surface between the second transmission gear 210 and the driven gear 220 increases, and thus a contact ratio may increase.

Accordingly, in the electronic parking brake, when the driving power of the driving motor 40 is transmitted to the wheel cylinder 30, since a gear having a helical structure is used, noise can be reduced and a user's product satisfaction can be improved. In addition, since inclination between the driving motor 40, the transmission shaft 50, and the wheel cylinder 30 may be variously changed to correspond to a design specification using the first and second helical gear parts 100 and 200, a degree of design freedom and installability can be improved.

The first angle a and the second angle b may be determined by considering a design specification in a vehicle installation process, and the first angle a and the second angle b may also be adjusted according to a parking state (flat/inclined ground surface) of the vehicle.

Alternatively, the driven gear 220 may be rotated by the driving power transmitted through the transmission shaft 50, and the brake shoes 20, which face each other, may be controlled to come into contact with the inner circumferential surface of the drum 10 or to be separated from the inner circumferential surface of the drum 10 according to a rotation direction of the driven gear 220.

That is, when the driven gear 220 rotates in one direction, a distance between both ends of the wheel cylinder 30 increases and the brake shoes 20, which face each other, are pushed, and thus the brake shoes 20 come into contact with the inner circumferential surface of the drum 10 so that braking may be performed, and when the driven gear 220 rotates in the other direction, the distance between the both ends of the wheel cylinder 30 decreases and the brake shoes 20, which face each other, are pulled, and thus the brake shoes 20 are separated from the inner circumferential surface of the drum 10 so that a braking force is released.

In addition, as illustrated in FIG. 5, the housing 300 is provided outside the actuator, and the housing 300 may include a first housing 310 surrounding the driving motor 40 and one side of the transmission shaft 50 and a second housing 320 surrounding the wheel cylinder 30 of the other side of the transmission shaft 50.

That is, as described above, the transmission shaft 50 may include the first shaft 51 connected to the driving motor 40 and the second shaft 52 connected to the wheel cylinder 30, the driving motor 40 and the first shaft 51 are packaged in the first housing 310, and the wheel cylinder 30 and the second shaft 52 are packaged in the second housing 320. Thereafter, when the driving motor 40 and the wheel cylinder 30 are installed on the backing plate 60, and the first housing 310 and the second housing 320 are simply installed, since the first shaft 51 and the second shaft 52 are coupled to each other to constitute the transmission shaft 50, the transmission shaft 50 does not need to be additionally installed, and thus an actuator installation process can be simplified.

As illustrated in FIGS. 2 and 5, a through part 321, which is installed to pass through the backing plate 60, may be formed in the second housing 320. A through hole, through which the through part 321 may pass, may be formed in the backing plate 60, and since the through part 321 of the second housing 320 is formed to be fixed in a state in which the through part 321 passes through the backing plate 60, the wheel cylinder 30 may be installed at a regular position, and thus, ease of installation can also be improved.

In addition, as illustrated in FIGS. 2 and 5, a coupling part 311 coupled to correspond to the through part 321 of the second housing 320 may be formed in the first housing 310. As described above, the first shaft 51 and the second shaft 52 constituting the transmission shaft 50 are coupled to each other in a process in which the first housing 310 and the second housing 320 are installed on the backing plate 60, and thus it is important to couple the first shaft 51 and the second shaft 52 so that the first shaft 51 and the second shaft 52 share the rotary axis 50a in order to maintain durability and prevent noise.

Accordingly, when the coupling part 311 is formed on the first housing 310 to correspond to the through part 321 of the second housing 320, not only ease of installation can be improved but also the first shaft 51 and the second shaft 52 can be positioned at regular positions to share the rotary axis 50a.

While the embodiments of the present invention have been described above, the spirit of the present invention is not limited to the embodiments proposed in this specification, and other embodiments may be easily suggested by adding, changing, and deleting components by those skilled in the art and will fall within the spiritual range of the present invention.

The invention claimed is:

1. An electronic parking brake comprising:
a drum which rotates with a wheel of a vehicle;
brake shoes installed at two sides in the drum to brake the drum;
a wheel cylinder configured to push the brake shoes to bring the brake shoes into contact with an inner circumferential surface of the drum; and
an actuator which generates driving power for driving of the wheel cylinder,
wherein the actuator includes a driving motor which generates the driving power for braking of the drum and a transmission shaft which transmits the driving power of the driving motor to the wheel cylinder, and
the electronic parking brake further comprises a first helical gear part having a transmission gear provided on the transmission shaft and a driven gear formed on the wheel cylinder and engaged with the transmission gear provided on the transmission shaft, a second helical gear part configured to transmit the driving power of the driving motor to the transmission shaft and the second helical gear part which transmits the driving power transmitted through the transmission shaft to the wheel cylinder,
a housing is provided outside the actuator; and
wherein the housing includes a first housing surrounding the driving motor and one side of the transmission shaft and a second housing surrounding the wheel cylinder and the other side of the transmission shaft,
wherein the transmission shaft comprises, a first shaft packaged within the first housing and connected to the driving motor; and
a second shaft packaged within the second housing and connected to the wheel cylinder, wherein the second shaft is fixedly coupled to the first shaft.

2. The electronic parking brake of claim 1, wherein the first helical gear part includes:
a driving gear provided on a driving shaft of the driving motor; and
a first transmission gear provided one side of the transmission shaft and engaged with the driving gear.

3. The electronic parking brake of claim 2, wherein a first angle is formed between a rotary axis of the driving gear and a rotary axis of the first transmission gear.

4. The electronic parking brake of claim 1, wherein a second angle is formed between a rotary axis of the second transmission gear and a rotary axis of the driven gear.

5. The electronic parking brake of claim 1, wherein:
the driven gear is rotated by the driving power transmitted through the transmission shaft; and
the brake shoes, which face each other, are controlled to come into contact with the inner circumferential surface of the drum or to be separated from the inner circumferential surface of the drum according to a rotation direction of the driven gear.

6. The electronic parking brake of claim 1, wherein a through part installed to pass through the backing plate is formed in the second housing.

7. The electronic parking brake of claim 1, wherein a coupling part coupled to correspond to the through part is formed in the first housing.

8. The electronic parking brake of claim 1, wherein the first shaft packaged within the first housing and connected to the driving motor is linearly aligned with the second shaft packaged within the second housing and connected to the wheel cylinder.

* * * * *